(12) United States Patent
Park

(10) Patent No.: US 8,818,772 B2
(45) Date of Patent: Aug. 26, 2014

(54) METHOD AND APPARATUS FOR VARIANCE ESTIMATION IN AMPLITUDE PROBABILITY DISTRIBUTION MODEL

(75) Inventor: Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 317 days.

(21) Appl. No.: 13/328,632

(22) Filed: Dec. 16, 2011

(65) Prior Publication Data
US 2012/0158381 A1 Jun. 21, 2012

(30) Foreign Application Priority Data
Dec. 17, 2010 (KR) .................. 10-2010-0130190

(51) Int. Cl.
*G06F 17/10* (2006.01)
(52) U.S. Cl.
USPC ............................................................ 703/2
(58) Field of Classification Search
None
See application file for complete search history.

(56) References Cited

U.S. PATENT DOCUMENTS

| 7,383,079 B2 * | 6/2008 | Holland .......................... 600/509 |
| 8,548,036 B2 * | 10/2013 | Umehara et al. ............... 375/227 |
| 2010/0246653 A1 | 9/2010 | Ronte et al. | |

FOREIGN PATENT DOCUMENTS

JP     2010-096600     4/2010

OTHER PUBLICATIONS

Chrissan et al., "A comparison of low-frequency radio noise amplitude probability distribution models", Radio Science, vol. 35, Issue 1, 2000, pp. 195-208.*
Kia Wiklundh, "Relation Between the Amplitude Probability Distribution of an Interfering Signal and its Impact on Digital Radio Receivers", IEEE Transactions on Electromagneteic Compatibility, vol. 48, No. 3, Aug. 2006.

* cited by examiner

*Primary Examiner* — Omar Fernandez Rivas
*Assistant Examiner* — Herng-Der Day
(74) *Attorney, Agent, or Firm* — Staas & Halsey LLP

(57) ABSTRACT

A variance estimation apparatus for an amplitude probability distribution (APD) model includes: an APD curve calculation unit for calculating an APD curve of an APD model for noise of an electronic device; and a linearity determination unit for determining a linearity of a slope of the APD curve calculated by the APD curve calculation unit. The apparatus further includes a variance processing unit for selectively performing equivalent variance processing or different variance processing based on the linearity determination result obtained from the linearity determination unit.

10 Claims, 4 Drawing Sheets

METHOD AND APPARATUS FOR VARIANCE ESTIMATION IN AMPLITUDE PROBABILITY DISTRIBUTION MODEL

CROSS-REFERENCE(S) TO RELATED APPLICATION(S)

The present invention claims priority of Korean Patent Application No. 10-2010-0130190, filed on Dec. 17, 2010, which is incorporated herein by reference.

FIELD OF THE INVENTION

The present invention relates to a technique for estimating variance from measurement data in an amplitude probability distribution (APD) model that exhibits time domain characteristics of noise generated from an electronic device, and more particularly, to an APD curve determination technique having two different variances, and a variation estimation method and apparatus using the same.

BACKGROUND OF THE INVENTION

Recently, noise characteristics of an electronic device in a time domain have been analyzed using an amplitude probability distribution (APD) curve.

Up to now, an APD model well matching a measurement value has been known, but two variance values for determining the model needs to be estimated from measurement data.

SUMMARY OF THE INVENTION

In view of the above, the present invention provides a variance estimation technique capable of obtaining a bit error rate while characterizing APD for noise of an electronic device by determining an equivalent property and a different property of two variances for determining an APD model and then estimating the two variances in the APD model.

In accordance with an aspect of the present invention, there is provided a variance estimation apparatus for an amplitude probability distribution (APD) model, the apparatus including: an APD curve calculation unit for calculating an APD curve of an APD model for noise of an electronic device; a linearity determination unit for determining a linearity of a slope of the APD curve calculated by the APD curve calculation unit; and a variance processing unit for selectively performing equivalent variance processing or different variance processing based on the linearity determination result obtained from the linearity determination unit.

In accordance with another aspect of the present invention, there is provided a variance estimation method for an amplitude probability distribution (APD) model, the method including: calculating an APD curve of an APD model for noise of an electronic device; determining whether a slope of the calculated APD curve is linear or nonlinear; and when the slope of the APD curve is nonlinear, performing different variance processing to estimate a variance.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

The present invention is characterized in that equivalent properties and different properties between two variances for determining an APD model are determined and then two variances are estimated, in an APD model for noise of an electronic device.

Specifically, in accordance with the present invention, after obtaining an APD curve from a noise measurement value of an electronic device, two variances are determined not to be the same as each other when the slope of the APD curve is nonlinear.

Then, in order to search two different vertexes, a histogram is obtained.

In a next step, two different vertexes are searched from the histogram of measurement data, and then a lower limit vertex and an upper limit vertex may be obtained to estimate two different variances.

Hereinafter, embodiments of the present invention will be described in detail with reference to the accompanying drawings which form a part hereof.

Figure 1:
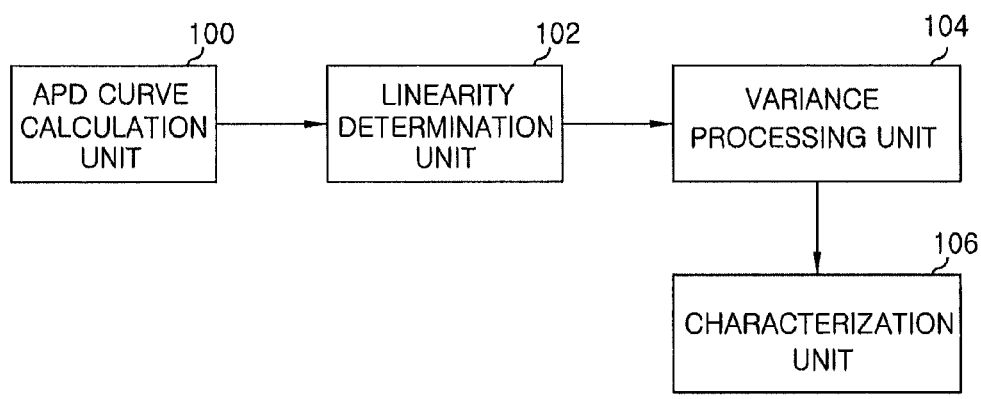
FIG. 1 illustrates a block diagram of a variance estimation apparatus for an APD model in accordance with an embodiment of the present invention.

FIG. 1 illustrates a block diagram of a variance estimation apparatus for an APD model in accordance with an embodiment of the present invention. The variance estimation apparatus includes an APD curve calculation unit 100, a linearity determination unit 102, a variance processing unit 104, a characterization unit 106 and the like.

As shown in FIG. 1, the APD curve calculation unit 100 serves to calculate an APD curve of an APD model for noise of an electronic device.

The linearity determination unit 102 determines a linearity of a slope of the APD curve calculated by the APD curve calculation unit 100.

The variance processing unit 104 selectively performs variance processing in accordance with an embodiment of the present invention, e.g., equivalent variance processing or different variance processing, based on the linearity determination result of the linearity determination unit 102.

In the embodiment of the present invention, when the slope of an APD curve is determined to be linear, the equivalent variance processing may be performed, or otherwise when the slope of an APD curve is determined to be nonlinear, the different variance processing may be performed.

The different variance processing in accordance with the embodiment of the present invention is performed to obtain a probability density function (PDF) of a histogram for the calculated APD curve, search two upper limit and lower limit vertexes of the obtained PDF, calculate measurement values of the searched upper limit and lower limit vertexes, and estimate a variance for each of the calculated measurement values of the upper limit vertex and the lower limit vertex.

The characterization unit 106 may characterize an APD curve for the variance processing result, e.g., the different variance processing result, obtained through the variance processing unit 104.

Hereinafter, variance estimation in an APD model in accordance with an embodiment of the present invention will be described in more detail with reference to the graphs of FIGS. 2 and 3.

In general, an APD model for noise of an electronic device may be presented as shown in the following Eq. 1:

$$APD(r) = \frac{T_p}{T}\exp\left(-\frac{r^2}{2\sigma_1^2}\right) + \left(1 - \frac{T_p}{T}\right)\exp\left(-\frac{r^2}{2\sigma_2^2}\right), \quad \text{Eq. 1}$$

wherein T denotes a period time, $T_p$ denotes a pulse width, and $\sigma_i^2$ (i=1, 2) is a variance.

A PDF of noise amplitude of an electronic device may be obtained as shown in the following Eq. 2 by differentiating the APD expression given in the above Eq. 1 and then adding a negative sign thereto.

$$pdf(r) = \frac{T_p}{T}\frac{r}{\sigma_1}\exp\left(-\frac{r^2}{2\sigma_1^2}\right) + \left(1 - \frac{T_p}{T}\right)\frac{r}{\sigma_2}\exp\left(-\frac{r^2}{2\sigma_2^2}\right) \quad \text{Eq. 2}$$

Also, a PDF in Eq. 2 may be generally obtained by a histogram of measurement data.

Figure 2:
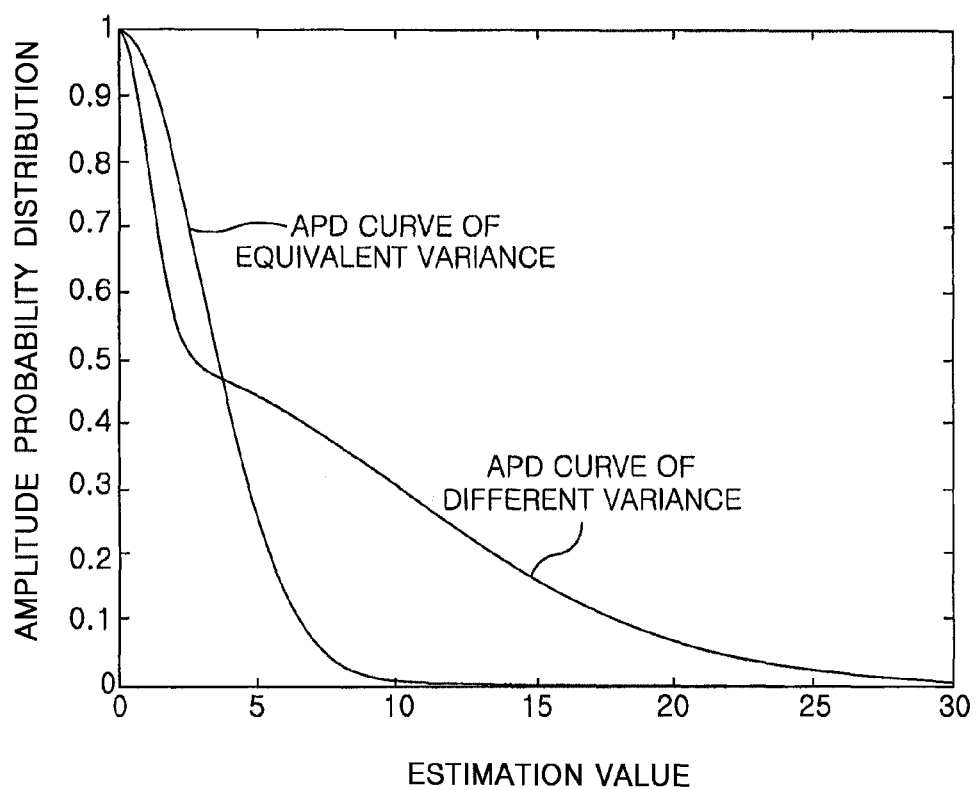
FIG. 2 is an APD curve property graph showing an equivalent property and a different property between two variances in accordance with an embodiment of the present invention.

FIG. 2 shows APD curves of Eq. 1 when the APD curve has an equivalent variance and a different variance.

As described by referring to FIG. 1, a slope of an APD curve having two different variances has nonlinear characteristics.

In case where an APD curve slope of noise does not become linear, since two variances are not the same as each other, two upper limit and lower limit vertexes may be searched by approximately obtaining a PDF of measurement data with a histogram, so that different two variances may be estimated.

Figure 3:
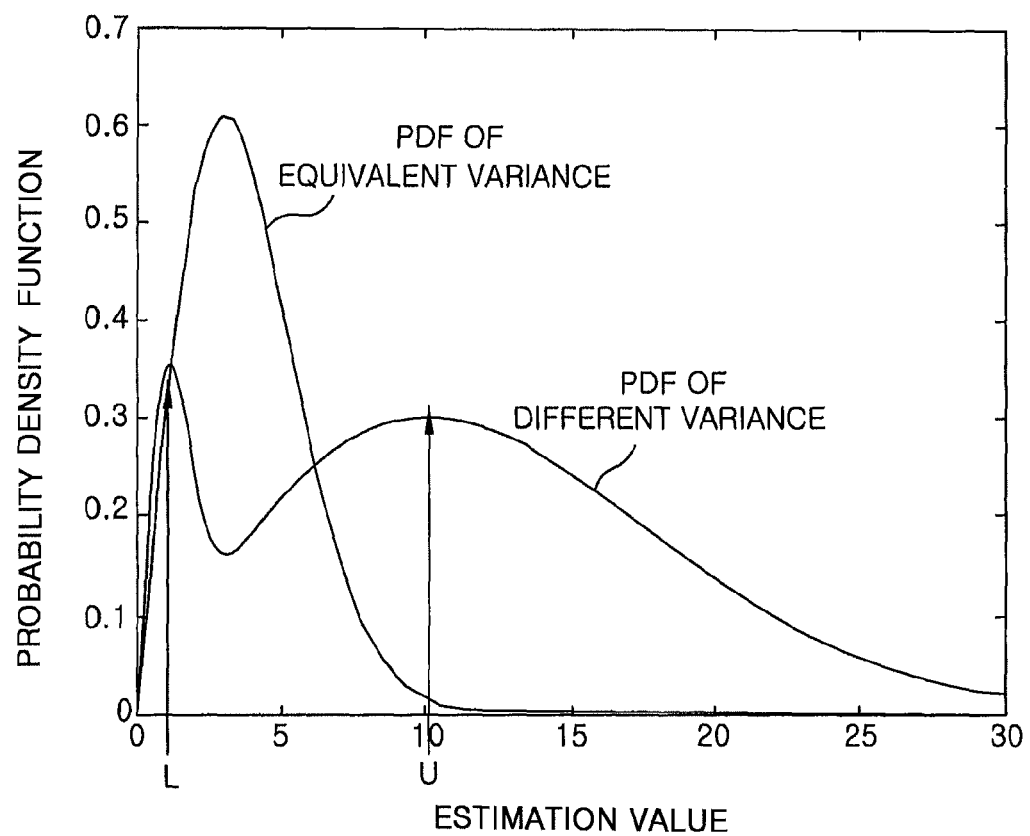
FIG. 3 is an example graph showing a probability density function (PDF) of an interference measurement signal based on the equivalent property and a different property between variances in accordance with an embodiment of the present invention.

FIG. 3 shows a histogram of a noise measurement value and PDF obtained by Eq. 2.

In the variance estimation process, a lower limit vertex and an upper limit vertex may be searched in the histogram, and values corresponding to the two upper limit and lower limit vertexes may be set as L and U, respectively.

Next, measurements values in the histogram are classified into values smaller than the measurement value L and values greater than the measurement value U, and two variances may be estimated as shown in the following Eq. 3:

$$\begin{cases} \hat{\sigma}_1^2 = \frac{1}{n_1 - 1}\sum_{i=1}^{n_1}(X_i - L)^2 & \text{if } X_i < L \\ \hat{\sigma}_2^2 = \frac{1}{n_2 - 1}\sum_{i=1}^{n_2}(X_i - U)^2 & \text{if } X_i > U \end{cases} \quad \text{Eq. 3}$$

wherein $n_1$ is a number of a measurement value $X_i$ less than a measurement value L, and $n_2$ is a number of a measurement value $X_i$ greater than a measurement value U.

Figure 4:
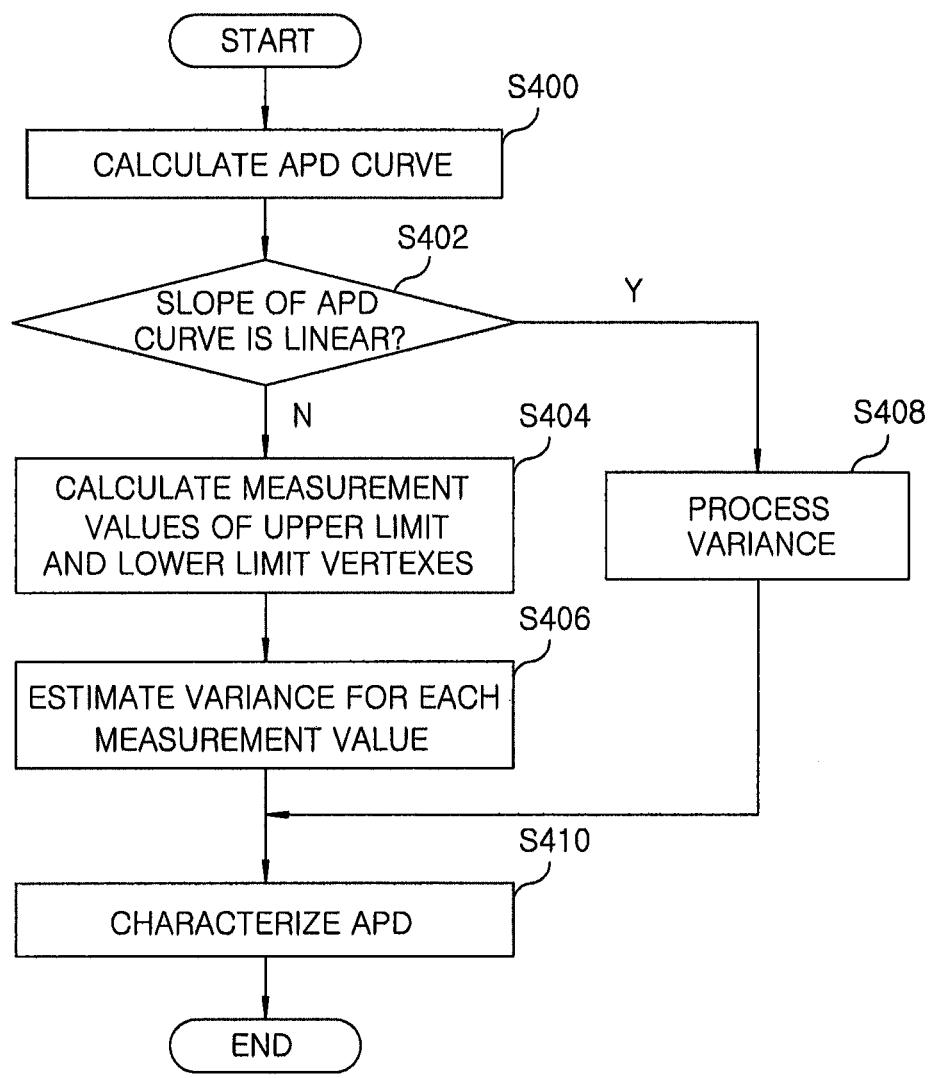
FIG. 4 is a flowchart illustrating a variance estimation method for an APD model in accordance with an embodiment of the present invention.

FIG. 4 is a flowchart illustrating a variance estimation method for an APD model in accordance with an embodiment of the present invention.

As shown in FIG. 4, an APD curve may be calculated by the APD curve calculation unit 100 in step S400, and calculated APD curve information is provided to the linearity determination unit 102.

The linearity determination unit 102 determines a slope linearity of the calculated APD curve. For example, it can be determined as to whether the slope of the APD curve is linear or nonlinear in step S402.

The linearity determination result of the APD curve obtained from the linearity determination unit 102 is provided to the variance processing unit 104.

As the linearity determination result, if it is determined to be nonlinear, the variance processing unit 104 performs the different variance processing in accordance with the embodiment of the present invention.

This different variance processing may include obtaining a PDF of a histogram for a calculated APD curve, searching two upper limit and lower limit vertexes of the obtained PDF, calculating measurement values U and L of the upper limit and lower limit vertexes in step S404, estimating a variance for each of the calculated measurement value U of the upper limit vertex and the calculated measurement value L of the lower limit vertex in step S406, and the like.

Here, the measurement value U of the upper limit vertex and the measurement value L of the lower limit vertex are as shown in FIG. 3.

Further, the variance estimation step S408 may be implemented by using Eq. 3.

For example, if the slope of the APD curve is determined to be linear (straight line), the variance processing unit 104 may perform general variance processing on measurement data in the APD curve and may use the processed result as two variance estimation values in step S408.

Finally, characterization of the APD curve is implemented by the estimated two variances through the characterization unit 106 in step S410.

In the embodiment of the present invention, two variances, which characterize an APD curve from an APD model of noises generated from an electronic device, may be provided. Moreover, a bit error rate may be obtained by using the two variances.

That is, a maximum probable bit error rate of a binary phase shift key (BPSK) system in a Gaussian channel environment may be obtained by substituting two variance estimation values obtained by the method in accordance with the embodiment of the present invention in Eq. 2, and then using Eq. 4 as follows:

$$P_b^{max} = \frac{1}{2\pi}\int_0^{2\pi}\int_0^{\infty} Q\left(\frac{\sqrt{E_b} + r\cos\phi}{\sqrt{N_0/2}}\right) pdf(r)\,dr\,d\phi \quad \text{Eq. 4}$$

wherein $E_b$ denotes a bit energy, $N_o$ denotes a noise power, $\phi$ denotes an angle random variable of an interference signal and follows a uniform distribution $(0,2\pi)$, and r denotes an amplitude of an interference signal.

In accordance with the embodiment of the present invention as described above, a variance estimation technique is implemented to obtain a bit error rate while characterizing APD for noise of an electronic device by determining an equivalent property and a different property of two variances that determines an APD model and then estimating the two variances in an APD model for noise of an electronic device.

While the invention has been shown and described with respect to the particular embodiments, it will be understood by those skilled in the art that various changes and modification may be made without departing from the scope of the invention as defined in the following claims.

What is claimed is:

1. A variance estimation apparatus of an amplitude probability distribution (APD) model, the apparatus comprising:
a processor to execute:
calculating an APD curve of the APD model for noise of an electronic device;
determining a linearity of a slope of the APD curve calculated; and
selectively performing equivalent variance processing or different variance processing corresponding with a result of the linearity determination, wherein the different variance processing includes:
obtaining a probability density function of a histogram for the calculated APD curve;
searching an upper limit vertex and a lower limit vertex of the obtained probability density function;
calculating measurement values of the upper limit vertex and the lower limit vertex of the probability density function;
estimating a variance for each of the calculated measurement values of the upper limit vertex and that of the lower limit vertex; and
obtaining a maximum probable bit error rate of a binary phase shift key (BPSK) system in a Gaussian channel environment using the variances estimated.

2. The apparatus of claim 1, wherein the equivalent variance processing is performed when the slope of the APD curve is linear, and the different variance processing is performed when the slope of the APD curve is nonlinear.

3. The apparatus of claim 1, wherein the different variance processing σ is performed by the following equation:

$$\begin{cases} \hat{\sigma}_1^2 = \dfrac{1}{n_1 - 1} \sum_{i=1}^{n_1} (X_i - L)^2 & \text{if } X_i < L \\ \hat{\sigma}_2^2 = \dfrac{1}{n_2 - 1} \sum_{i=1}^{n_2} (X_i - U)^2 & \text{if } X_i > U \end{cases}$$

wherein $n_1$ denotes a number of a measurement value $X_i$ less than the measurement value of the lower limit vertex L, and $n_2$ denotes a number of a measurement value $X_i$ greater than the measurement value of the upper limit vertex U.

4. The apparatus of claim 1, further comprising:
characterizing the APD curve based on the estimated variances.

5. A variance estimation method of an amplitude probability distribution (APD) model, the method comprising:
calculating, by a processor, an APD curve of the APD model for noise of an electronic device;
determining whether a slope of the calculated APD curve is linear or nonlinear; and
when the slope of the APD curve is nonlinear, selecting to perform different variance processing to estimate a variance, wherein the different variance processing includes:
obtaining a probability density function of a histogram for the calculated APD curve;
searching an upper limit vertex and a lower limit vertex of the obtained probability density function;
calculating measurement values of the upper limit vertex and the lower limit vertex of the probability density function; and
estimating a variance for each of the calculated measurement values of the upper limit vertex and that of the lower limit vertex; and
obtaining a maximum probable bit error rate of a binary phase shift key (BPSK) system in a Gaussian channel environment using the variances estimated.

6. The method of claim 5, wherein said estimating a variance includes classifying measurement values in the probability density function into values less than the measurement value of the upper limit vertex and values greater than the measurement value of the lower limit vertex.

7. The method of claim 5, wherein said estimating a variance performs the different variance processing σ by the following equation:

$$\begin{cases} \hat{\sigma}_1^2 = \dfrac{1}{n_1 - 1} \sum_{i=1}^{n_1} (X_i - L)^2 & \text{if } X_i < L \\ \hat{\sigma}_2^2 = \dfrac{1}{n_2 - 1} \sum_{i=1}^{n_2} (X_i - U)^2 & \text{if } X_i > U \end{cases}$$

wherein $n_1$ denotes a number of a measurement value $X_i$ less than the measurement value of the lower limit vertex L, and $n_2$ denotes a number of a measurement value $X_i$ greater than the measurement value of the upper limit vertex U.

8. The method of claim 5, further comprising:
characterizing an APD curve based on the estimated variances.

9. The method of claim 5, further comprising:
when the slope of the APD curve is linear, selecting to perform the variance processing on measurement data in the APD curve and using the processed results as two variance estimation values.

10. The method of claim 5,
wherein the bit error rate is obtained by using the following equation:

$$P_b^{max} = \frac{1}{2\pi} \int_0^{2\pi} \int_0^{\infty} Q\left( \frac{\sqrt{E_b} + r\cos\phi}{\sqrt{N_0/2}} \right) pdf(r) dr d\phi$$

wherein $E_b$ denotes a bit energy, $N_0$ is denotes a noise power, $\phi$ denotes an angle random variable of an interference signal and follows a uniform distribution $(0, 2\pi)$, and r denotes an amplitude of an interference signal.

* * * * *